Figure 1:
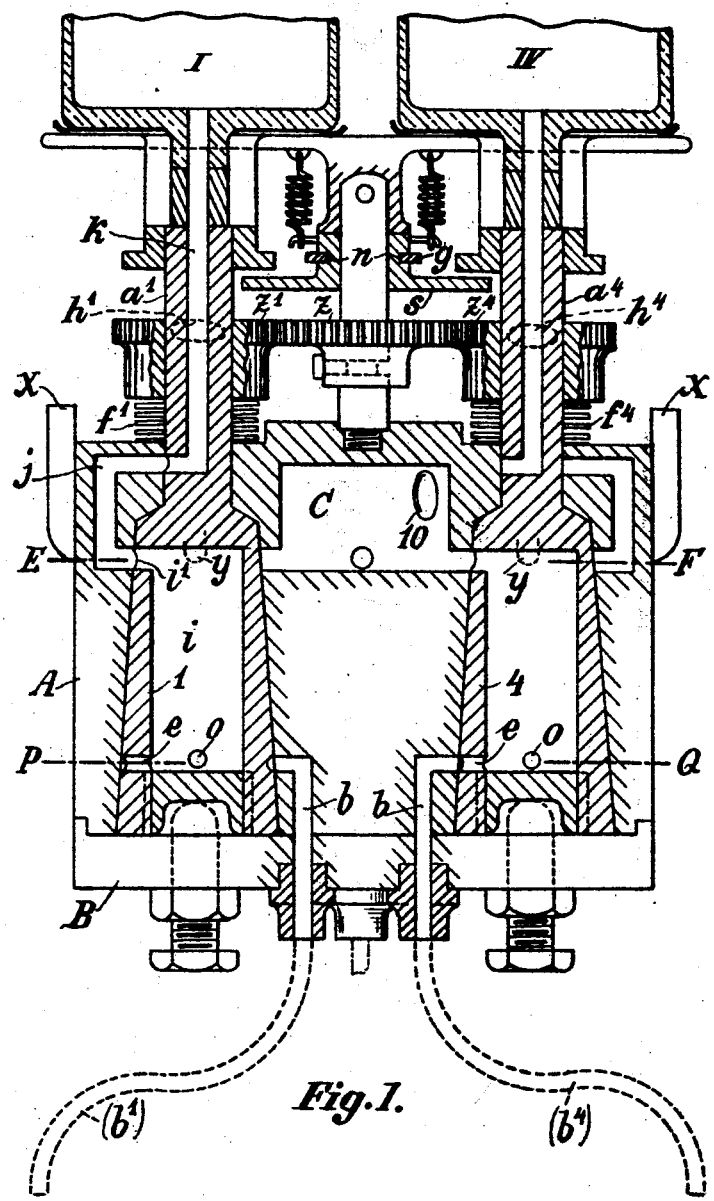

Dec. 7, 1926.                                                                    1,609,676
O. VETTER
APPARATUS FOR THE SELECTIVE RETAILING OF LEMONADE AND OTHER BEVERAGES
Filed March 12, 1926        3 Sheets-Sheet 1

Inventor
Otto Vetter

Dec. 7, 1926.
O. VETTER
1,609,676
APPARATUS FOR THE SELECTIVE RETAILING OF LEMONADE AND OTHER BEVERAGES
Filed March 12, 1926    3 Sheets-Sheet 2
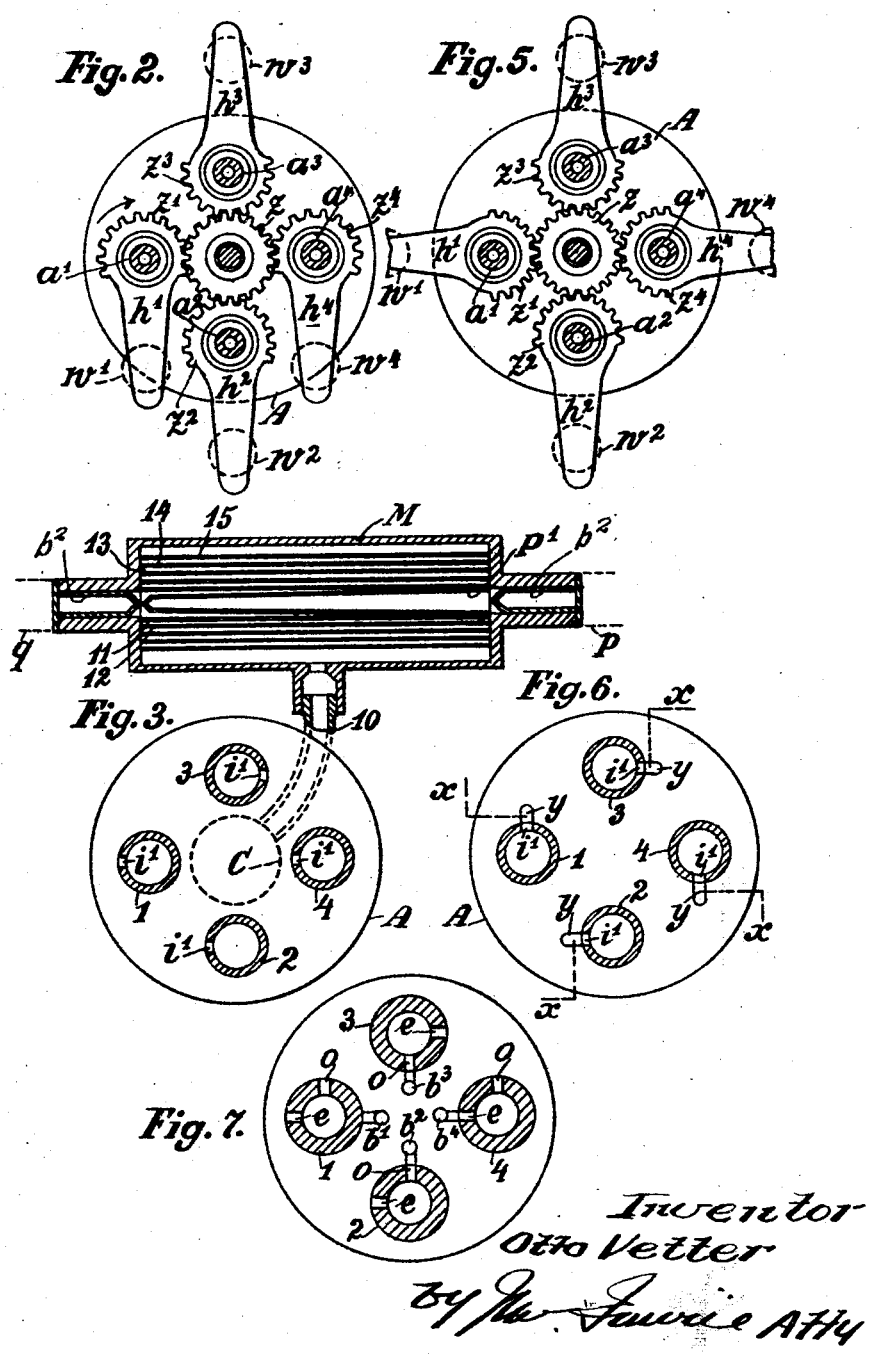

Dec. 7, 1926.　　　　　　　　　　　　　　　　　　1,609,676
O. VETTER
APPARATUS FOR THE SELECTIVE RETAILING OF LEMONADE AND OTHER BEVERAGES
Filed March 12, 1926　　　3 Sheets-Sheet 3
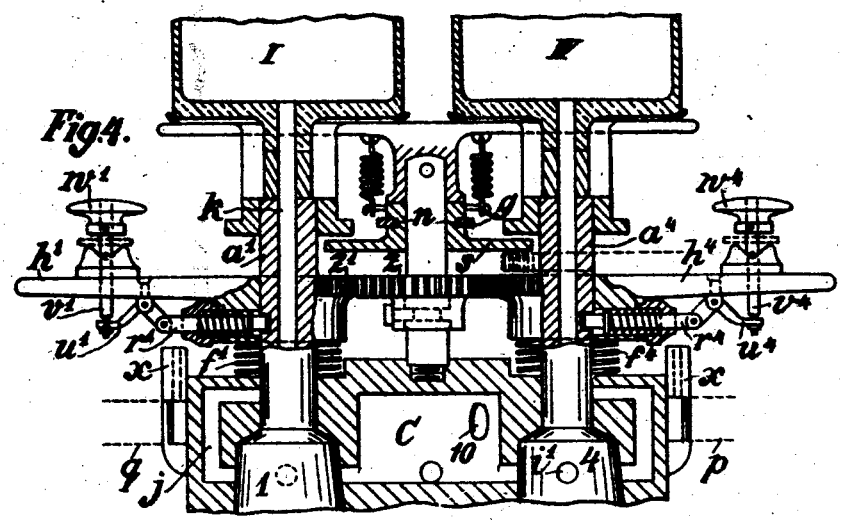

Patented Dec. 7, 1926.

1,609,676

UNITED STATES PATENT OFFICE.

OTTO VETTER, OF HOCHEMMERICH, GERMANY.

APPARATUS FOR THE SELECTIVE RETAILING OF LEMONADE AND OTHER BEVERAGES.

Application filed March 12, 1926, Serial No. 94,290; and in Germany March 14, 1925.

My invention relates to an apparatus for the selective retailing of various kinds of lemonades and similar or other beverages under carbonic acid pressure. Besides for this main purpose of the apparatus, it may be used also for the selective mixing of various chemical solutions or (and) of different concentration, every solution or other liquid being contained in a receptacle of its own.

The improved apparatus comprises, in general, a plurality of hollow cock plugs, each of which forms a measuring chamber of a certain capacity. All plugs are assembled in a common casing and can be adjusted singly or in any combination in such a manner that they can be filled with juices of fruits, lemonade essences or the like, the respective juices or essences or the like being preserved in separated receptacles. Their number depends upon the number of kinds of beverages to be retailed by means of the apparatus. Every plug can be so turned that its chamber communicates with a chamber containing water having a certain percentage of carbonic acid, the juice and the water being then led, under the pressure of the carbonic acid, into a delivery tube from which the mixture escapes into a glass or the like.

In order to enable the operator to operate the plugs singly or in any combination a suitable coupling mechanism is provided, as is all more fully described hereinafter.

The water receptacle which supplies all cock plugs and which, therefore, is generally located centrally in the apparatus communicates also with a specially designed mixing device connected with a carbonic acid bottle, as well as with a water supply pipe, the water being impregnated with the carbonic acide in said device.

The invention is illustrated diagrammatically and by way of example in the accompanying drawing in which Figure 1 is a vertical section through an apparatus having four cock plugs. there being, however, visible in this figure only two plugs, of which one (left hand) is in its filling position and the other (right hand) in its delivery or tapping position, and the figure showing also the lower portions (the upper portions being broken away) of the juice vessels pertaining to those two cocks; Figure 2 is a plan of a set of cog-wheels and levers for operating the plugs. this figure being drawn to a reduced scale relatively to Fig. 1; Figure 3 is a horizontal section in the plane E—F of Fig. 1, the scale being also that of Fig. 1 and the position of the plugs corresponding also to Fig. 1; Figure 4 is an illustration similar to Fig. 1, the scale being, however, also in this case that of Fig. 2 and the plug operating levers being partly in another position, viz, in that shown in Fig. 5 which is a view similar to Fig. 2. the difference residing just in the other position of said levers; Figure 6 is a view similar to Fig. 3, but with another position of the plugs, viz, corresponding to Fig. 5, and Figure 7 is a section in the plane P—Q of Fig. 1, also in the reduced scale (as in Figs. 2–6).

Referring to said figures, A (Fig. 1) denotes a casing which is closed at its bottom by a plate B, and provided in its upper portion with a chamber C. Around and below this chamber a plurality of cock plugs (four in the example shown) 1, 2, 3, 4 are arranged. each plug being turnable independently of the other ones. The shafts $a^1$ $a^2$ $a^3$ $a^4$ of the plugs extend upwardly and out of the casing A and are each provided with a longitudinal passage communicating with one of four vessels I II III IV, the conducting connection being effected by means of pieces of rubber hose or with the aid of stuffing boxes. The vessels contain the fruit juice or an essence or the like which is to be admixed to water in order to form the lemonade or the like.

Attached to each plug shaft is a lever or an arm $h^1$ $h^2$ $h^3$ $h^4$ (Figs. 2 and 5), by means of which the plugs can be turned manually. The hub-like inner portions or ends of said levers or arms are provided with toothed sectors $z^1$ $z^2$ $z^3$ $z^4$, and between all these sectors a cog-wheel $z$ is located up on a short vertical spindle secured to the top of the casing A (Fig. 1). The cog-wheel $z$ is merely rotatable, not axially shiftable, but the cogged sectors $z^1$ $z^2$ $z^3$ $z^4$ are axially shiftable upon the plug shafts $a^1$ $a^2$ $a^3$ $a^4$, and are shifted along upon them independently of one another by the respective arms or levers $h^1$ $h^2$ $h^3$ $h^4$.

Each of these latter is provided with an engaging and disengaging locking device (Fig. 4) consisting of a horizontal locking bolt $r$ (that is to say: $r^1$ $r^2$ $r^3$ $r^4$), a bell-crank lever $u$ ($u^1$ $u^2$ $u^3$ $u^4$), a depressible spindle or bolt $v$ ($v^1$ $v^2$ $v^3$ $v^4$), and a knob $w$ ($w^1$ $w^2$ $w^3$ $w^4$). How these parts $r$ $u$ $v$ $w$ are arranged relatively to, and connected with, each other is distinctly shown on the lefthand and the righthand side of Fig. 4.

The seat for each knob is shaped similar to a groove, and immediately below each knob a cross-pin extends through the appertaining spindle or bolt. When a locking bolt $r$ is in its locking position, as in Fig. 4, the respective cross-pin is located in the groove of the respective seat (as in Fig. 4), but when the knob is lifted so as to withdraw the locking bolt by the intermediary of the bell-crank lever and the knob bolt, and when then the knob with the bolt is turned by 90°, the cross pin becomes seated upon the ridges of the seat (as indicated in dotted lines in Fig. 4) whereby the disengaged locking bolt is retained in its position of disengagement. Instantly after the disengagement a helical spring $f$ ($f^1$ $f^2$ $f^3$ $f^4$) lifts the appertaining cogged sector ($z^1$ or $z^2$ or $z^3$ or $z^4$) whereby the respective cogged sector is uncoupled from the centre wheel $z$, as indicated in dotted lines in the righthand half of Fig. 4.

The plug shafts $a^1$ $a^2$ $a^3$ $a^4$ are connected with hubs of the hand levers $h^1$ $h^2$ $h^3$ $h^4$ by feathers and grooves (not shown) so that, although the hubs are axially movable along said shafts, each shaft may be independently turned when the appertaining hand lever is moved to one or the other side, provided, the respective cogged sector be disengaged from the cog-wheel $z$. Each plug can be turned for 180°. The two plugs visible in Fig. 1 show the two end positions, in which the lefthand plug, that is to say, its chamber, communicates with the juice vessel I through the plug shaft passage $k$, an angular passage $j$ provided in the casing A, and a port $i^1$ provided in the wall of the plug $l$, at the upper end of the chamber thereof. The air displaced by the juice escapes in the same way, of course in the reverse direction. Two more ports, $e$ and $o$ are at the lower end of the plug chamber, $e$ being located vertically below $i^1$, and $o$ being located by 90° remote therefrom.

When the plug chamber has been filled, the plug is turned whereby the communications of the passage $j$ with the passage $k$ and the port $i^1$ are interrupted; when then the turning is continued, two other communications are being established, in that the port $i^1$ communicates with the central chamber C and the port $e$ communicates with the outlet or delivery passage $b$ also provided in the casing A. The chamber C had, prior thereto, been filled with aerated water produced in a mixing device M (Fig. 3) consisting of a casing having at one end a branch $q$ for connection with a water supply pipe and at the other end a branch $p$ for connection with a carbonic acid bottle. These branches are preferably provided with rubber nipples $p^2$ and $p^2$ forming lip valves at their inner ends. From the branch $p$ extends through the casing M a perforated conical pipe $p^1$ which terminates only closely at the nipple $q^1$ and is closed at its end, the carbonic acid escaping, therefore, in very numerous fine jets from the pipe $p^1$ into the casing through said perforations and being, therefore, distributed very finely. Around the pipe $p^1$ are a plurality of perforated concentric tubes (13, 14, 15), through the perforations of which the carbonic acid, as well as the water must pass whereby the two fluids are mixed intimately with each other. The mixture escapes finally through a lateral branch into a pipe 10 which terminates at the chamber C (Figs. 1 and 3). The pipe connecting the carbonic acid bottle (not shown) with the branch $p$ of the casing M is provided, of course, with a pressure-reducing valve (also not shown). Owing to the connection of the casing M with the chamber C also this latter is constantly under the pressure of the carbonic acid. As the chamber C communicates with the (filled) plug chamber (for instance 4 in Fig. 1) as long, as this chamber communicates with the appertaining delivery pipe ($b^4$, through the port $e$), the aerated water having first driven the juice out of the plug chamber escapes thereafter also on the way $e$, $b^4$ and flows into the glass having received the measured quantity of the juice so that the lemonade is formed in that glass and finished therein by stirring so as to mix intimately the two fluids, as necessary.

When the desired quantity of lemonade has been produced, the plug is turned for 90° so that its port $i^1$ comes into communication with a port $y$ (Fig. 1) communicating with an air pipe $x$, and at the same time the port $e$ comes into communication with the delivery pipe whereby the aerated water that remained in the plug chamber is permitted to escape into the glass. Now the operation is completely finished and the plug is further turned until it arrives in its initial position (Fig. 1, lefthand half), in which the plug chamber is again being filled with juice.

While I have described in the preceding paragraph the operation only with respect to one plug chamber, I now proceed to show that and how two or more plugs can be actuated at a time so that two or more glasses of lemonade, that is to say, of different lemonades, may be produced at a time.

In the constructional form of the device as shown in the drawing it is assumed that four different kinds of lemonades are to be produced and delivered. Supposing, all four hand levers $h^1$ $h^2$ $h^3$ $h^4$ be uncoupled from the central cog-wheel $z$ it will be obvious that each plug can be operated singly. Now, in order to operate them all at a time an axially shiftable disk $s$ (Figs. 1 and 4) is depressed by the forked ends $g$ of a hand lever (not shown), said ends engaging a circular nut $n$ provided in a hub of said disk $s$. Normally this latter is held in its upper position by tensile springs located above it, as shown in said figures. The disk $s$ is larger than the central wheel $z$, that is to say, it extends partly over the cogged sectors $z^1$ $z^2$ $z^3$ $z^4$, and it is therefore possible to depress all sectors at a time by the disk $s$. When this is being done, the sectors mesh with the central wheel and the locking bolts $r^1$ $r^2$ $r^3$ $r^4$ engage the recesses provided for them in the plug shafts whereby the sectors are kept in mesh with the central wheel. When then any of the hand levers is turned this motion will be transmitted to all plugs and each thereof will operate as already described.

It is also possible to operate only three or only two plugs at a time, the other ones or one remaining then at rest in spite of the depression of all cogged sectors by the disk $s$. That is effected by preventing the locking bolt of the other plugs or plug from entering into the recess provided for it in the respective plug shaft, and this is effected by turning the respective knob or knobs $n$ (for instance $n^1$ or $n^2$, etc.) for 90° whereby the respective cross pin or pins will be seated upon the ridges of the respective knob groove or grooves, all as already described with respect to Fig. 4.

It is also possible to obtain either only juice or only aerated water from the apparatus. In the first of these cases the filled plug (filled with juice) is turned from the filling position (Fig. 1, left-hand) only for 90° in such a direction that the port $i^1$ communicates with the port $y$, and the port $o$ communicates with the delivery pipe. In the other of said cases, the (empty) plug is so turned, also for 90° (but in the other direction) that the port $y$ communicates with the chamber C, the port $o$ communicating also in this case with the delivery pipe.

I claim:

1. A device for the selective retailing of lemonades or other beverages, comprising, in combination, a casing having a chamber for water and carbonic acid, and having ports for establishing communications with said chamber; a plurality of rotatory plugs having each a chamber in it which is adapted to serve as a measuring chamber, and having ports for establishing communications with this chamber as well as with outlet ports; juice receptacles and passages connecting each thereof with a plug chamber; outlet or delivery means, and means for turning each plug so as to cause its chamber to communicate first with the appertaining juice vessel and then with said outlet means, substantially as set forth.

2. A device for the selective retailing of lemonades or other beverages, comprising, in combination, a casing having a chamber for water and carbonic acid, and having ports for establishing communications with said chamber; a plurality of rotatory plugs having each a chamber in it which is adapted to serve as a measuring chamber, and having ports for establishing communications with this chamber, as well as with outlet ports; juice receptacles and passages connecting each thereof with a plug chamber; outlet or delivery means, cogged sectors located singly shiftable upon the individual plug shanks, and a handle at each sector; springs holding the sectors in an elevated position and engaging and disengaging means for locking each sector to its shank when having been shifted into a lower position; a central cog-wheel located in the plane of the depressed sectors, and an axially shiftable disk located above said central wheel and extending partly over the sectors also in their elevated position, and means for depressing said disk, so as to cause it to bring the said sectors into mesh with the said central cog-wheel, substantially as described.

3. A device for the selective retailing of lemonades or other beverages, comprising, in combination, a casing having a chamber for water and carbonic acid, and having ports for establishing communications with said chamber; a plurality of rotatory plugs having each a chamber in it which is adapted to serve as a measuring chamber, and having ports for establishing communications with this chamber, as well as with outlet ports; juice receptacles and passages connecting each thereof with a plug chamber; outlet or delivery means; means for turning each plug so as to cause its chamber to communicate first with the appertaining juice vessel and then with said outlet means; and a mixing device comprising a tubular casing, concentric perforated tubes therein, an end branch for connection with a water supply, another end branch for connection with a carbonic acid supply, and a lateral branch for connection with the chamber for water and carbonic acid.

In testimony whereof I affix my signature.

OTTO VETTER.